(12) United States Patent
Evert

(10) Patent No.: US 6,689,270 B1
(45) Date of Patent: Feb. 10, 2004

(54) WATER TREATMENT APPARATUS REDUCING HARD WATER DEPOSITS IN A CONDUIT

(76) Inventor: Lynn Evert, 3701 Kirby, Suite 859, Houston, TX (US) 77098

( * ) Notice: Subject to any disclaimer, the term of this patent is extended or adjusted under 35 U.S.C. 154(b) by 0 days.

(21) Appl. No.: 08/926,301

(22) Filed: Sep. 5, 1997

(51) Int. Cl.$^7$ ................................ C02F 1/461
(52) U.S. Cl. ............. 205/706; 205/730; 205/745; 204/197; 204/248; 204/275.1
(58) Field of Search ................. 205/706, 730, 205/745; 204/197, 248, 275

(56) References Cited

U.S. PATENT DOCUMENTS

| | | | | |
|---|---|---|---|---|
| 2,719,797 A | * | 10/1955 | Rosenblatt et al. | 204/290 F |
| 3,378,479 A | * | 4/1968 | Colvin et al. | 204/248 |
| 4,325,798 A | * | 4/1982 | Mack | 204/248 |
| 4,902,391 A | * | 2/1990 | Ibbott | 204/248 |

OTHER PUBLICATIONS

"Fitting for auto supply pipework" DL/RHS/A7731GB (no date).*
Hydrascale Electrolytic Scale Inhibitor Scale Modification Tests at Aston University, Dr. R.G. Temple, Dated Jan. 1993, pp. 1–19.
Fitting for Auto Supply Pipework, Patents Act 1977, DL/RHSA7731GB, pp. 1–13.

* cited by examiner

Primary Examiner—Arun S. Phasge
(74) Attorney, Agent, or Firm—Law Office of Tim Cook P.C.

(57) ABSTRACT

Water having dissolved salts therein causing scaling is treated by flowing through a passage in an elongate tubular member. The tubular member has a first metal inside surface exposed to the water. A second metal surface is positioned therein and the two surfaces have areas of 1:1 up to about 125% with the second metal being different from the first metal. The metal surfaces are electrically insulated from each other so that current flow between the two is through the water.

21 Claims, 1 Drawing Sheet

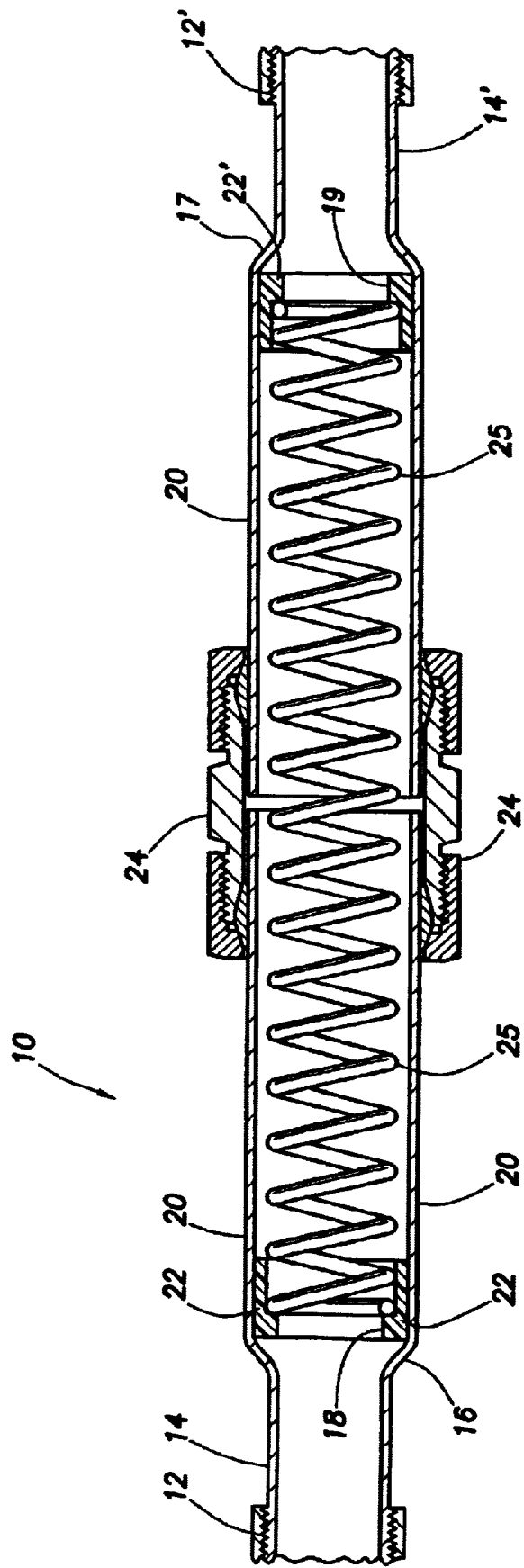

WATER TREATMENT APPARATUS REDUCING HARD WATER DEPOSITS IN A CONDUIT

BACKGROUND OF THE DISCLOSURE

The present disclosure is directed to a system for reducing water scaling in a system with flowing water. Water normally obtained from practically every source is loaded with dissolved salts which form scale deposits under certain circumstances. The collection of water scale is more or less related to the amount of hardness in the water. Water becomes hard as the dissolved salt content increases. The most common sources of hard water are water accumulated in lakes or from artesian wells. Typically, lake water carries a higher level of hardness in the water, but artesian water is not exempt from the problem. The problem derives from dissolved salts and mostly calcium salts carried in the water. As the water flows over limestone formations, it will carry away a part of the limestone in the form of dissolved rock salts which are most commonly $CaCO_2$. Not only are calcium salts commonly encountered, magnesium salts also occur. All of the various salts encountered in water flow in nature create the risk of dissolving the salts into the flowing stream, accumulating in a lake, and ultimately forming water scale deposits when flowing in a metal pipe. The extreme of this is seen in the Dead Sea and the great Salt Lake in Utah. There, the water flows into a basin and cannot escape except through evaporation. The lakes become highly mineralized and are therefore so laden with salt accumulation that they are, for all practical purposes, poisonous to plant life. When that water is used, obviously for purposes other than cooking or drinking, the water tends to leave a deposit which builds up so that flowing water engenders the risk of scaling. The problem of scaling varies with the region which depends on the geology of the region. In the Panhandle of Texas, flowing water carries a very large amount of dissolved minerals in it. It is not uncommon for the water minerals to accumulate on the metal surfaces of pipes downstream from the water source and ultimately reduce the effective cross-sectional area of the pipes. The tendency to come out of solution and form a deposit is dependent on many factors including concentration, water temperature, flow velocity, turbulence, and the roughness of the surface. Even where the surface is extremely smooth when initially installed, once a thin layer of deposited scale is formed, the growth can increase rapidly as the scale builds up. As a generalization, this requires expensive steps to remove and clear the passage. It is especially a problem in equipment where the volume of highly mineralized water is significant. That problem is most often seen in systems where there is recirculation such as cooling systems or heating systems using water. Untreated water and even water which has been treated in an economical way will nevertheless build up large amounts of scale. It is probably a very chronic problem in closed flow loops in heating and air conditioning systems. There is also a great difficulty in stationary border plants and the like.

In solution, the dissolved salts are best considered in an ionic state. Thus, the limestone rock deposits may have some calcium $CaCO_2$ along with other salts. When dissolved, the ionic disassociation simply scatters, in a random distribution in the stream of water, the constituents. Accordingly, a flowing stream of water will include any number of cations and anions flowing in the stream. The cations and anions are the material ultimately forming a deposit downstream which is characterized by the more common ions in the stream. It is not uncommon to build up a scale deposit which becomes hard over time as the dissolved minerals are plated onto a surface which will hold and accumulate the deposits. Therefore, this prompts the accumulation of substantial amounts of deposited material so that the hardness restricts flow, interferes with heat transfer, and is a cumulative detrimental problem.

SUMMARY

In this systems an apparatus is installed in the flowing water which functions as a pipe, thereby making up part of the plumbing system. The pipe component is made of metal. In this aspect, the first metal is the metal in contact with the flowing water. The pipe supports, on the interior, a second metal which is spaced from the first metal, thereby defining first and second metal surfaces where the two metal surfaces are different in electrochemical activity. The electrochemical activity of metals range from one extreme for platinum, gold and silver to the other extreme for aluminum. Ranking of the metals is believed well known in this aspect. In a flowing water stream, the two metals define separated metal surfaces. The flowing water, in cooperation with the different metals, forms an electrolytic cell. The potential difference between the two metals is well known from the table of relative activities of the various metals. This creates a current flow between the two metals. The, current flow is from metal to metal, hence, across the flowing water. The current flow generally is resisted by the water because water is a relatively good insulator (referring to pure water). The impurities in the water, however, and especially the dissolved minerals, provide ionic carriers for charge interchange between the metal surfaces. This charge interchange is accomplished by migration between the two metal surfaces. The ionic current flow is significant in that the dissolved minerals tend to collect at the metal surfaces. There will be a preference at one surface or the other dependent on the electrolytic activity of the two metals with respect to each other. There will be a tendency of ions to be neutralized. This neutralization results in formation of a soft deposit in the region. In other words, the current transfer mechanism changes the binding forces involved in depositing the dissolved mineral ions at one of the metal surfaces so that plating is accomplished, yet with a reduction in hardness.

Consider a worse case description. A water system installed in the Texas Panhandle for transfer of water accumulated from rain runoff is extremely mineralized and can form deposits in metal pipes which have a hardness approaching that of sheet rock. It also has a consistency in color approximating that of sheet rock. Vigorous effort is required to clean the pipe. The present apparatus sets out a system in which a softer form of scaling occurs, and just as importantly, the scaling which does occur is localized easily on the surface of the present invention.

This system incorporates a bimetal cell which is self-powered. By that, no electrical power is required from the exterior. It makes its own electrical current, and that current is defused as it flows through the water between the two metal surfaces so that the defused flow forms a defused distribution of deposits on one of the metal surfaces. The deposits are cumulative. However, deposits have reduced hardness and are mechanically removed more readily. The present apparatus, when installed in a flowing stream, reduces the mineral hardness downstream. The deposits resultant from hard water are likewise reduced downstream. This is true in a variety of circumstances. For instance, the downstream device may be a water recirculation system for transfer of heat. In that system, there will be a cooler region and a hotter region. One example of this is a cooling system for an air conditioning plant. Another example of this is a boiler system where the water is heated in a nest of pipes in a boiler to convert into steam and is recycled by condensing the spent steam. Of course, where steam is lost, there will be a modest flow of water added to make up the total feed. Suffice it to say, many other examples can be identified in which water scale is a serious problem, and especially serious in a closed flow loop of the type just mentioned. The present invention sets forth a mechanism which significantly changes the plating mechanism and also reduces the amount of scale accumulated downstream.

The present apparatus is therefore summarized as a fitting which is installed to be electrochemically active in a flowing water stream. The water is delivered into and out of the fitting by an installed elongate sleeve having an inside metal surface, that being the first metal. There is a radially spaced metal surface on the interior that is electrically insulated from the first metal surface. The second metal surface in conjunction with the first defines an electrolytic cell. Water is directed through the cell and sets up current flow through the metal components. The system also incorporates a set of fittings which enable it to be assembled in a plumbing system and disassembled for easy servicing.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

The only drawing shows, in sectional view, an external housing having the form of a pipe and defining a first metal surface on the interior in conjunction with a supported coil formed of a second metal which is electrically isolated in the housing so that water flows through and between the two metal surfaces.

DETAILED DESCRIPTION OF THE PREFERRED EMBODIMENT

Attention is now directed to the only drawing where the numeral 10 identifies the apparatus of the present disclosure. The description will begin with the external shape and construction which brings out features enabling connection in a system. The term system refers to a water flow system. It is typically water delivered under pressure where the water carries various levels of hardness as a result of flowing over terrain laden with limestone and similar minerals. Such rock formations are dissolved by the flowing water and are carried in the water to define the water hardness which can vary from negligible to extreme. As a first aspect, the exterior elongate member has the form of a pipe of fixed length and diameter. The diameter can vary in proportion to the length, but for household systems, it is suggested that the pipe have a flow capacity equal to that of 1 inch pipe, operating at perhaps 100 psi, obviously increased by several fold for over design and safety. The device 10 typically measures between 12 and 24 inches in length. It can be increased in length, diameter and weight for commercial situations. From the left, a pipe thread 12 is incorporated to enable easy connection with a union or other fitting upstream. Flow will be assumed to be from left to right although the construction of the device enables its operation with flow from either end. The threaded end portion connects with a neck 14 which defines the throughput permitted by the device. An enlargement 16 enables the larger diameter tubular member 20. The thickness of the wall remains substantially the same while the transition 16 steps out the diameter so that certain equipment can be included in the interior. Moreover, this diameter is sufficiently large so that there is no loss in volumetric throughput. The device is intended to provide 100% flow capacity. It is especially important to avoid defining a narrow neck restriction. The right side of the tubular member 20 terminates at a transition 17 to a neck 14' with a pipe thread 12'.

The present apparatus supports at the left end a cylindrical insert sleeve 22 which is formed of PTFE or other plastic materials. It is an electrical insulator. The outer cylindrical shell 20 is formed of two similar portions or halves which are joined together by a union 24. The union 24 is constructed of any suitable material. Preferably it includes a metal coupling so that the left hand half is connected to the right hand half. The union provides electrical continuity and structural support. The outer cylindrical member 20 is formed of a metal or an alloy of sufficient strength to provide the structure desired. The inside face, however, is coated. The coating is sufficiently uniform and thick so that it provides an overlay of at least as many microns so that an impervious metal layer is provided on the interior. This metal layer comprises the first metal. That metal will be discussed in detail below at which time a description of the electromotive series will be given. The electromotive series is defined at page F-102 of the 57th Edition of the CRC Handbook of Chemistry and Physics. That definition states that the electromotive series comprises a list of metals arranged in the decreasing order of their tendency to pass into ionic form by losing electrons. Typically. hydrogen is included in that series to serve as a reference point although it is not practically a metal. The other metals are in the periodic table. Accordingly, the member 20 is coated on the interior. That coating defines the first metal. That metal coating includes the coupling 24 at the location where it is exposed to water.

The resilient insulator sleeve 22 and insulator sleeve 22' serves as a support for the second metal. In physical structure, the second metal has the form of a coil spring 25. The coil spring is inserted on the interior. The coil spring preferably has a resilient metal core. Typically the coil spring is formed of wire stock. The wire is springy in the sense that spring steel has that characteristic. Indeed, it is wound so that the coil spring 25 fits between the enlargements at 16. This enables the coil spring to rest on the insulator sleeve 22. It is therefore electrically isolated and not in contact with any other metal. The coil 25 is formed of at least one metal. As noted, it is formed by winding from rod stock to define the coil spring. The rod stock enables construction of a resilient coil spring with a defined amount of springiness. Since no load is placed on it, a low cost steel such as 1010 or 1020 steel will suffice. Obviously, other material with comparable resiliency and elasticity can also be identified.

The coil spring 25 is coated with an external metal coating. The entire exterior is preferably coated to a depth of many microns and comprises a second metal. The second metal operates in conjunction with the first metal, i.e., the metal on the sleeve 20. The metal coating on the coil spring is selected from the electromotive series so that an appropriate difference can be obtained from the second metal. The potential difference between the two metals is important to the operation of the device. The second metal (placed on the coil spring 25) is attached by electroplating or other appropriate chemical deposition techniques. This enables the second metal to have a high quality surface and sufficient thickness to assure that it is only a single metal which is exposed to the water, not the metal which makes up the coil spring. Again, the coil spring can be made of a single metal if desired but cost savings are normally obtained by making the spring 25 out of an inexpensive steel and then coating it with the second metal. That typically is cheaper than attempting to fabricate a coil out of a single metal, i.e., copper. Focus is now directed to the surface area of the first and second metals. Looking solely at the surface of the enlarged tubular member 20, it has an aggregate length represented by the symbol L and a diameter D. Surface area is given by the relationship L×D×pi. The second metal (on the coil spring 25) has an area also given by the relationship just noted but the respective diameters are quite different; therefore, the respective lengths must also be different. Consider an easy example for purposes of illustration. Assume that the ID of the member 20 is 1.000 inches and the length is precisely 20 inches of exposed area (this ignores the area under the plastic insulator). Accordingly, with a length of 20 inches and ID of 1.000, the coil spring must have a diameter and length which will vary inversely. If, for instance, the coil stock has a diameter of 0.1000, then the length must be 200 inches. This requires that the pitch of the coil be such that the turns of the coil will enable the coil to fit within the 20 inch length just noted while yet providing the aggregate surface area. So to speak, the coil is designed for a rod stock (hence, diameter) selected so that the number of turns will reasonably fit in the length for the first metal, or 20 inches in this example. To provide matching surfaces between the first and second metals, and using the dimensions given as an example, the coil has to be wound with a lead to compress the spring into the requisite number of turns to enable 200 inches of rod stock to be confined within about 20 inches.

It will be understood that some portion of the first metal surface (the inside face of the enlarged portion 20) and the second metal surface (the outside face of the coil spring 25) is ineffective in the insulator 22. This depends on the area of contact by the insulator 22 and insulator 22'. Where the insulator is snug against the first metal then the insulator may well take that contacted portion of metal out of operation. There is a loss of area to the detriment of current flow between the first and second metals. This is less of a problem for the coil which is contacted only at a line of contact on the outer face of the coil turns. Again, it is not that there is a complete loss of effectiveness; it is simply that the electrical insulator prompts current to flow around the insulator between the two metals.

One of the metal surfaces will be more active than the other in accordance with the electromotive activity for the two metals. As an example, silver can be selected as one of the surfaces and the other can be zinc, copper, nickel and so on. The difference between the two determines the potential difference of the system to provide current flow. Moreover, this current flow prompts a coating on the two surfaces. The current interacts ionically with the dissolved mineral salts in the system and produces a plating at one of the two metal surfaces. Because of the current flow, the plating is accomplished with reduced binding forces so that the dissolved salts in the water are much softer when it plates out as a result of encountering the current flow. Absent the current flow, the scale deposits on the interior of the pipe can be extremely hard and can be removed only by strong abrasion or perhaps exposure to strong acids.

As a generalization, using the present apparatus, a soft powdery accumulation collects on one or the other metal surface. As a generalization, it prefers one surface over the other. One of the two metal surfaces will collect more of the material. Interestingly, the downstream plumbing system will also collect scale deposits but they are additionally reduced in hardness compared to that without the present invention. In general terms, the scale collected at all locations is easier to remove, and seems to have reduced binding or adhesive forces by at least 50%, and typically 75% or so. The binding forces in the deposits not only make the bond weaker, but the invention reduces the amount of scale deposits. Because of that, the plumbing system is easier to clean. It is especially easier to clean at the apparatus 10 which can be easily removed and quickly dusted to knock loose the accumulated scale. In ordinary circumstances without this invention, the scale can be very hard so that it will not be dislodged merely by dusting. Rather, it requires a wire brush or the like for removal.

An important aspect of this invention derives from the relationship of the two surface areas. One surface area will attract more of the deposits than the other. Ideally, that metal surface is increased by about 25% over the other surface area that attracts fewer scale deposits. It is conjectured that the scale deposits are attracted to the relative polarity surfaces dependent on the charge of the ionic salts in solution and taking into account the relative electrochemical activity of the two metals. Accordingly, it is generally desirable that one of the two surfaces be about 25% larger than the other because it will collect more scale, and as the scale accumulates, that reduces somewhat the effective surface area. To be sure, the reduction of effective surface area is significantly less with this approach than without, and it is conjectured this is because the accumulated scale, using this system, is soft, light and almost feathery to the touch. Such generalizations are hard to quantify but they are distinctly easier deposits to collect and remove by contrast with deposits from an unprotected pipe. Literally those deposits can be as hard as sheet rock.

Going now to the proportionate areas, the optimum is to make one of the two metal surfaces about 25% greater than the other. Going back to the two ratios, with a 1:1 ratio, the system is given by the relationship $D_1L_1=D_2L_2$. This modified form enhances the DL product on one side or the other by 25%. With this suggested enhanced ratio for one metal, the system will then accumulate on that metal a very substantial amount of scale which is easily removed.

For convenience, the apparatus 10 is illustrated with threads 12 and 12' but it can also be connected with a quick disconnect fitting at both ends. If desired, the coil can be sized so that it is smaller in maximum diameter than the narrow neck 14 and narrow neck 14' thereby enabling the coil to be easily pulled from the interior. This mounting contemplates positioning the coil so that it is supported only on the insulative mounting sleeves and sized so that it can easily be pulled by finger engagement from the interior, cleaned and restored all in the matter of two or three minutes. Installation is then accomplished easily by simply inserting the coil back to the illustrated position.

While the foregoing is directed to the preferred embodiment, the scope thereof is determined by the claims which follow.

What is claimed is:

1. A water scale reduction apparatus to be connected in a plumbing system to reduce scaling downstream thereof comprising:

(a) an elongate tubular flow member having a central passage with first and second passage openings directing a water flow therethrough;

(b) a first metal surface in said passage having a specified area and formed on the interior of a conduit defining said flow passage;

(c) an elongate second metal surface in said passage and spaced from said first metal surface, wherein said second metal surface is formed on the exterior surface of an elongate metal coil positioned within said conduit and between said passage openings;

(d) an electrical insulator mounting said second metal surface in said passage free of contact with said first metal surface so that current flow between said first and second metal surfaces is through water in said passage; and (e) wherein one of said metal surfaces has greater affinity than the other so that said one surface collects greater deposits of water scale than the other and said surface has greater surface area than the other surface.

2. The apparatus of claim 1 wherein said first and second metal surfaces create an electric current in the water carried by said passage, and said conduit comprises an elongate hollow cylindrical housing.

3. The apparatus of claim 2 wherein said first metal surface is a plated metal formed on the interior of said hollow cylindrical housing and has a surface area within a specific length thereof exposed to water; and said second metal surface is metal plated on said exterior of said elongate coil spring having multiple turns within said specified length.

4. The apparatus of claim 3 wherein said insulator comprises first and second spaced insulator sleeves sized to snugly fit inside of said flow member and said sleeves define a support surface to support and align said coil spring so that said coil spring rests thereon.

5. The apparatus of claim 4 wherein said first and second metal surfaces comprise thin metal coatings of metals selected to define which said metal has said greater affinity.

6. The apparatus of claim 1 wherein said one surface area is greater by up to about 25%.

7. The apparatus of claim 6 wherein said one surface comprises an ionic or cationic attractor so that water scale collects thereon dependent on scale ionic movement.

8. The apparatus of claim 1 wherein said metal surfaces comprise different metals defining a voltage difference therebetween, and said metal surfaces are confined between a pair of passage openings.

9. A method of reducing water scale deposits in a plumbed water distribution system comprising the steps of:

(a) placing in a water flow system an elongate first metal surface in contact with the water, wherein said first metal surface coats the interior of a conduit through which water flows;

(b) placing in the water flow system a second metal surface electrically insulated from the first metal surface, wherein said second metal surface coats the exterior of a coil spring of rod stock aligned axially within said conduit;

(c) selecting the first and second metals so that an electric current flows between the said metal surfaces in water therebetween, wherein one of said metal surfaces collects some scale thereon in preference to the other of said metal surface, and said scale collecting surface is increased in area with respect to the other metal surface;

(d) flowing water with scale materials between the metal surfaces so that scale materials interact with the electric current and said surfaces to reduce downstream hardness in the water.

10. The method of claim 9 including the step of removing one of the two metal surfaces for cleaning, and positioning the removed and cleaned metal surface in a pair of spaced electrical insulators for subsequent use.

11. The method of claim 9 including the step of coating said first and second metal surfaces to a thickness of several microns.

12. The method of claim 9 including the step of forming scale on said scale collecting surface and brushing the scale from said surface.

13. A water scale reduction apparatus to be connected in a plumbing system to reduce scaling downstream thereof comprising:

(a) an elongate flow member having a central passage with first and second passage openings directing a water flow therethrough;

(b) a first metal surface formed on the interior of said flow member and in said passage having a specified area;

(c) an elongate second metal surface formed on the exterior of an elongated body axially aligned within said passage and spaced from said first metal surface, wherein surface area of said first metal differs from surface area of said second metal depending upon affinity of said metals;

(d) an electrical insulator mounting said second metal surface in said passage free of contact with said first metal surface so that current flow between said first and second metal surfaces is through water in said passage; and (e) wherein said first and second metal surfaces are deployed between said openings with water therebetween.

14. The apparatus of claim 13 wherein said first and second metal surfaces create an electric current in the water carried by said passage, and said passage is defined by an elongate hollow cylindrical housing.

15. The apparatus of claim 13 wherein said elongated body comprises an elongate metal coil fitting between said passage openings.

16. The apparatus of claim 15 wherein said first metal surface is a plated metal inside of said passage and has a surface area within a specific length thereof exposed to water; and said second metal surface comprises a metal coating on an elongate coil spring having multiple turns within said specified length.

17. The apparatus of claim 16 wherein said insulator comprises first and second spaced insulator sleeves sized to snugly fit inside of said flow member and said sleeves define a support surface to support and align said coil spring so that said coil spring rests thereon.

18. The apparatus of claim 13 wherein said first and second metal surfaces comprise thin metal coatings of metals selected to enable current flow therebetween.

19. The apparatus of claim 18 wherein one of said metal surfaces has greater affinity than the other so that said one surface collects greater deposits of water scale than the other and said surface has greater area than the other.

20. The apparatus of claim 19 wherein said one surface area is greater by up to about 25%.

21. The apparatus of claim 20 wherein said one surface comprises an ionic or cationic attractor so that water scale collects thereon dependent on scale ionic movement.

* * * * *